United States Patent
Heim et al.

(10) Patent No.: US 9,323,985 B2
(45) Date of Patent: Apr. 26, 2016

(54) AUTOMATIC GESTURE RECOGNITION FOR A SENSOR SYSTEM

(71) Applicant: Microchip Technology Incorporated, Chandler, AZ (US)

(72) Inventors: Axel Heim, Munich (DE); Eugen Roth, Munich (DE); Roland Aubauer, Wessling (DE)

(73) Assignee: MICROCHIP TECHNOLOGY INCORPORATED, Chandler, AZ (US)

( * ) Notice: Subject to any disclaimer, the term of this patent is extended or adjusted under 35 U.S.C. 154(b) by 203 days.

(21) Appl. No.: 13/967,314

(22) Filed: Aug. 14, 2013

(65) Prior Publication Data

US 2014/0050354 A1     Feb. 20, 2014

Related U.S. Application Data

(60) Provisional application No. 61/684,039, filed on Aug. 16, 2012.

(51) Int. Cl.
| | | |
|---|---|---|
| *G10L 21/06* | (2013.01) | |
| *G06K 9/00* | (2006.01) | |
| *G06F 3/01* | (2006.01) | |
| *G06F 3/0488* | (2013.01) | |

(52) U.S. Cl.
CPC ............ *G06K 9/00335* (2013.01); *G06F 3/017* (2013.01); *G06F 3/04883* (2013.01)

(58) Field of Classification Search
CPC ....... G06F 3/017; G06F 3/0346; G06F 3/005; G06F 3/011; G10L 17/00; G10L 25/78
USPC ........ 704/276, 233, 254; 345/156; 455/414.1; 702/141; 715/719, 830; 725/10
See application file for complete search history.

(56) References Cited

U.S. PATENT DOCUMENTS

| | | | | |
|---|---|---|---|---|
| 8,136,053 | B1* | 3/2012 | Miller ................. | G06F 3/04883 345/156 |
| 8,253,684 | B1* | 8/2012 | Lloyd ..................... | G06F 3/017 345/156 |
| 8,760,395 | B2* | 6/2014 | Kim ........................ | G06F 3/011 345/156 |
| 8,782,567 | B2* | 7/2014 | Latta ....................... | G06F 3/017 345/156 |
| 8,922,485 | B1* | 12/2014 | Lloyd ................... | G06F 3/0487 345/156 |
| 2009/0051648 | A1* | 2/2009 | Shamaie ............... | G06F 3/0346 345/156 |
| 2009/0183193 | A1* | 7/2009 | Miller, IV ............... | A63F 13/02 725/10 |
| 2010/0071965 | A1 | 3/2010 | Hu et al. ..................... | 178/18.06 |

(Continued)

FOREIGN PATENT DOCUMENTS

WO        2011/098496 A1      8/2011    ................ G06F 3/01

OTHER PUBLICATIONS

Baum, Leonard E. et al., "A Maximization Technique Occurring in the Statistical Analysis of Probabilistic Functions of Markov Chains," The Annals of Mathematical Statistics, vol. 41, No. 1, 8 pages, 1970.

(Continued)

*Primary Examiner* — Michael Colucci
(74) *Attorney, Agent, or Firm* — Slayden Grubert Beard PLLC

(57) ABSTRACT

A method for gesture recognition including detecting one or more gesture-related signals using the associated plurality of detection sensors; and evaluating a gesture detected from the one or more gesture-related signals using an automatic recognition technique to determine if the gesture corresponds to one of a predetermined set of gestures.

27 Claims, 9 Drawing Sheets

(56) References Cited

U.S. PATENT DOCUMENTS

| | | | | |
|---|---|---|---|---|
| 2010/0121636 | A1* | 5/2010 | Burke | G06F 3/0346 704/233 |
| 2010/0153890 | A1 | 6/2010 | Wang et al. | 715/863 |
| 2011/0289456 | A1* | 11/2011 | Reville | G06F 3/017 715/830 |
| 2012/0226981 | A1* | 9/2012 | Clavin | G06F 3/005 715/719 |
| 2012/0323521 | A1* | 12/2012 | De Foras | G06F 3/017 702/141 |
| 2013/0085757 | A1* | 4/2013 | Nakamura | G10L 15/22 704/254 |
| 2014/0004834 | A1* | 1/2014 | Mian | G06F 3/017 455/414.1 |

OTHER PUBLICATIONS

Rabiner, Lawrence R., "A Tutorial on Hidden Markov Models and Selected Applications in Speech Recognition," Proceedings of the IEEE, vol. 77, No. 2, 30 pages, Feb. 1989.

Behrends, Ehrhard, *Introduction to Markov Chains with Special Emphasis on Rapid Mixing*, Vieweg Verlag, book, 4 pages, 2000.

Welch, Lloyd R., "Hidden Markov Models and the Baum-Welch Algorithm," IEEE Information Theory Society Newsletter, vol. 53, No. 4, 24 pages, Dec. 2003.

International Search Report and Written Opinion, Application No. PCT/EP2013/067098, 11 pages, Oct. 21, 2013.

* cited by examiner

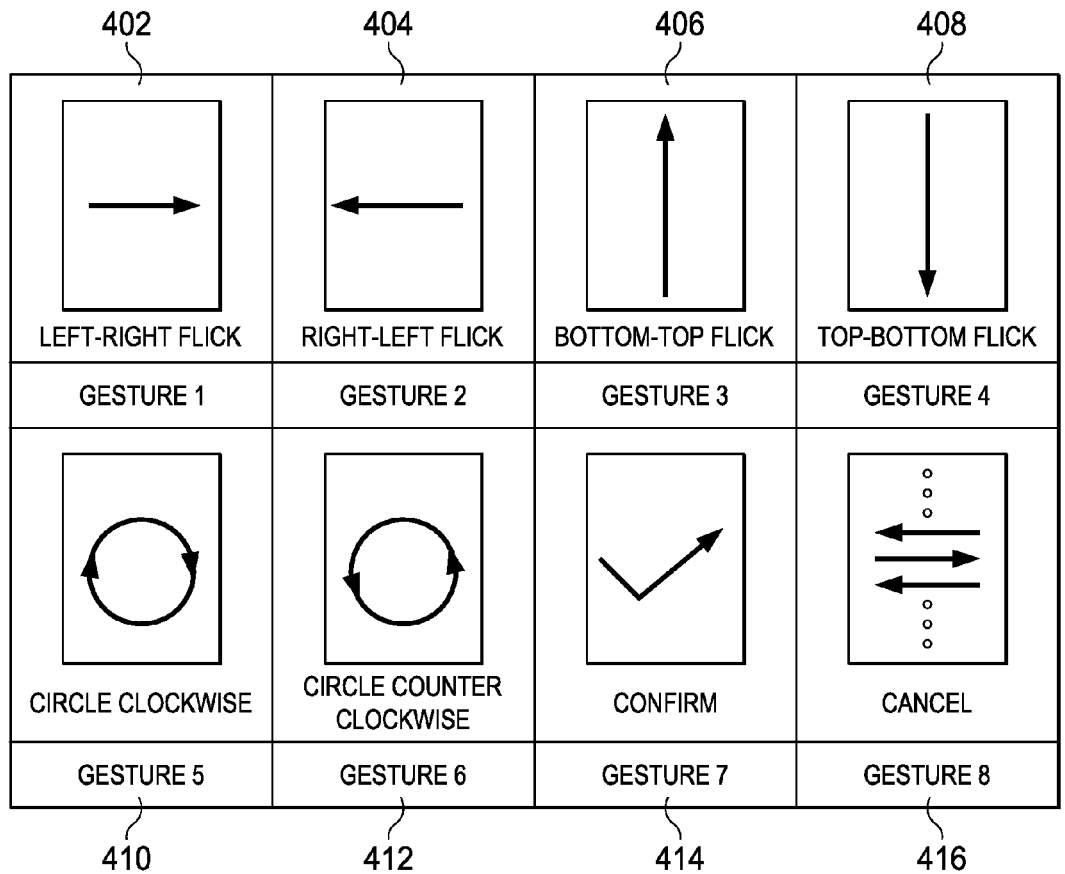
FIG. 4
| EB | 1.5 | 2.3 | 0.9 | -0.4 | -1.9 | -1.2 | -0.5 |
| EL | -3.4 | -4.1 | -1.3 | -2.1 | -1.8 | -1.1 | -0.2 |
| ET | -0.5 | -0.2 | -0.1 | 0.2 | 0.8 | 1.2 | 1.5 |
| ER | 0.2 | 0.4 | 0.7 | 1.3 | 2.1 | 3.0 | 4.2 |
FIG. 5A
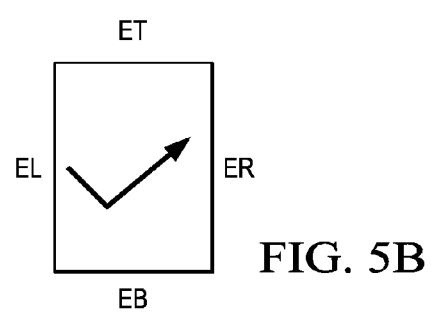
FIG. 5B

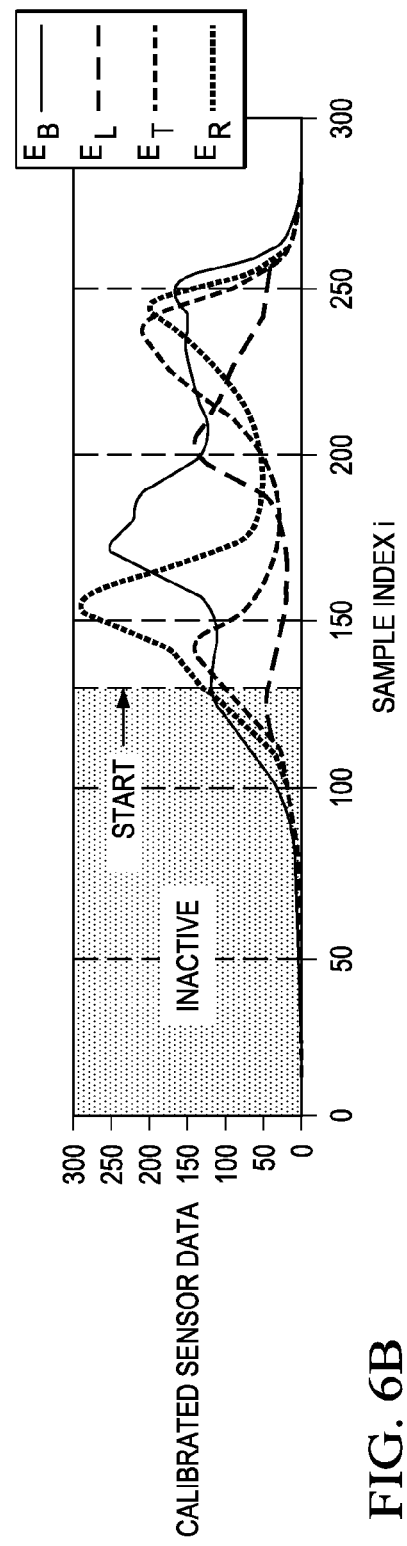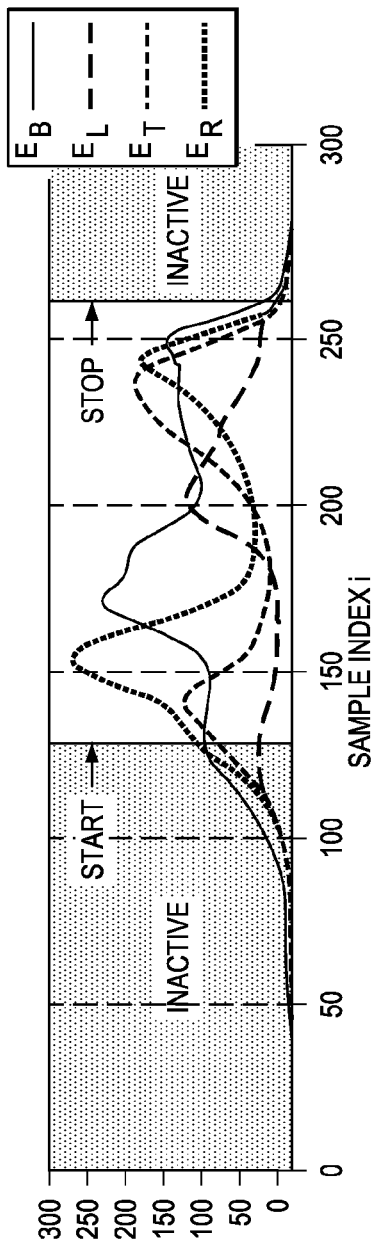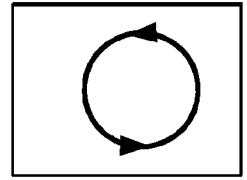

FIG. 9

| | | | |
|---|---|---|---|
| LINEAR HMM | $\pi = \begin{bmatrix} 1 \\ 0 \\ 0 \\ \vdots \\ 0 \end{bmatrix}$ ; | $A = \begin{bmatrix} 0.9 & 0.1 & 0.0 & \cdots & 0.0 \\ 0.0 & 0.9 & 0.1 & \cdots & 0.0 \\ 0.0 & 0.0 & 0.9 & \cdots & 0.0 \\ \vdots & \vdots & \vdots & \ddots & \vdots \\ 0.0 & 0.0 & 0.0 & \cdots & 1.0 \end{bmatrix}$ ; | $B = \begin{bmatrix} b_{jm} \end{bmatrix}_{3XM'}$ $b_{jm} = \frac{1}{M}$ |
| CIRCULAR HMM | $\pi = \begin{bmatrix} 1 \\ 0 \\ 0 \\ \vdots \\ 0 \end{bmatrix}$ ; | $A = \begin{bmatrix} 0.9 & 0.1 & 0.0 & \cdots & 0.0 \\ 0.0 & 0.9 & 0.1 & \cdots & 0.0 \\ 0.0 & 0.0 & 0.9 & \cdots & 0.0 \\ \vdots & \vdots & \vdots & \ddots & \vdots \\ 0.0 & 0.0 & 0.0 & \cdots & 0.9 \end{bmatrix}$ ; | $B = \begin{bmatrix} b_{jm} \end{bmatrix}_{4XM'}$ $b_{jm} = \frac{1}{M}$ |

FIG. 11

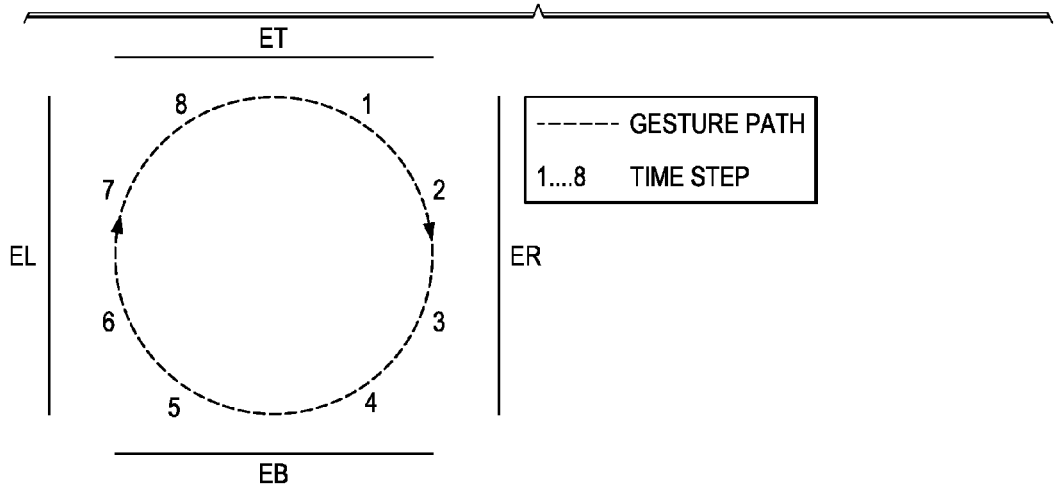

| TIME STEP | 1 | 2 | 3 | 4 | 5 | 6 | 7 | 8 |
|---|---|---|---|---|---|---|---|---|
| EB | 0.5 | 1.3 | 1.8 | 0.3 | -0.3 | -1.2 | -1.7 | -0.2 |
| EL | -0.4 | -0.1 | 0.2 | 1.1 | 1.9 | 0.3 | -0.3 | -0.6 |
| ET | -0.5 | -1.8 | -1.6 | -0.5 | 0.4 | 1.2 | 1.8 | 0.7 |
| ER | 0.7 | 0.3 | -0.3 | -1.8 | -0.9 | -0.2 | 0.3 | 0.7 |

| RECOGNIZED GESTURE → % | ↑ | ↓ | ← | → | ⟲ | ⟳ | ∨ | ↓↑↓ | REJECTED | SUM |
|---|---|---|---|---|---|---|---|---|---|---|
| ↑ | 100 | 0 | 0 | 0 | 0 | 0 | 0 | 0 | 0 | 100 |
| ↓ | 0 | 100 | 0 | 0 | 0 | 0 | 0 | 0 | 0 | 100 |
| ← | 0 | 0 | 96 | 0 | 0 | 0 | 0 | 1 | 3 | 100 |
| → | 0 | 0 | 0 | 95 | 1 | 0 | 1 | 0 | 3 | 100 |
| ⟲ | 0 | 0 | 0 | 0 | 97 | 0 | 1 | 0 | 2 | 100 |
| ⟳ | 0 | 0 | 0 | 0 | 0 | 95 | 0 | 5 | 0 | 100 |
| ∨ | 0 | 0 | 0 | 0 | 1 | 0 | 95 | 0 | 3 | 100 |
| ↓↑↓ | 0 | 0 | 0 | 0 | 4 | 0 | 0 | 96 | 0 | 100 |

PERFORMED GESTURE

FIG. 12

AUTOMATIC GESTURE RECOGNITION FOR A SENSOR SYSTEM

CROSS REFERENCE TO RELATED APPLICATIONS

This application claims priority from U.S. Provisional Patent Application Ser. No. 61/684,039 filed Aug. 16, 2012, which is hereby incorporated by reference in its entirety as if fully set forth herein.

TECHNICAL FIELD

The present disclosure relates to methods and systems for sensor systems, and in particular to automatic gesture recognition for such systems. More particularly, this disclosure relates to a gesture recognition system that is invariant to translation and/or scaling of the gestures and for a relatively large distance between the hand/finger and the sensor system.

BACKGROUND

Systems for touchless detection and recognition of gestures are known. Such systems may be based on capacitive (e.g., surface capacitive, projected capacitive, mutual capacitive, or self capacitive), infrared, optical imaging, dispersive signal, ultrasonic or acoustic pulse recognition sensor technology.

Capacitive sensor systems, for example, can be realized by generating an alternating electrical field and measuring the potential difference (i.e., the voltage) obtained at a sensor electrode within the field. Depending on the implementation, a single electrode may be used, or a transmitting and one or more receiving electrodes may be used. The voltage at the sensor electrode(s) is a measure for the capacitance between the sensor electrode and its electrical environment. That is, it is influenced by objects like a human finger or a hand which may in particular perform a gesture within the detection space provided by the electrode arrangement. Further, from this voltage, for example, the distance of a finger or the gesture may be deduced. This information can be used for human-machine interfaces.

Given a three dimensional positioning system, the straightforward and most high level approach for gesture detection is to take the x/y position estimate as input to the automatic gesture recognition system and use the z-distance for start/stop criteria. As the position estimate is the outcome of one or more stages in which the sensor data is processed (calibration, non linear relation of calibrated sensor value and distance, position being trigonometric function of distances), and each stage introduces extra uncertainty, using x/y/z estimate can be more prone to errors than using data from earlier processing stages.

SUMMARY

These, and other, aspects of the disclosure will be better appreciated and understood when considered in conjunction with the following description and the accompanying drawings. It should be understood, however, that the following description, while indicating various embodiments of the disclosure and numerous specific details thereof, is given by way of illustration and not of limitation. Many substitutions, modifications, additions and/or rearrangements may be made within the scope of the disclosure without departing from the spirit thereof, and the disclosure includes all such substitutions, modifications, additions and/or rearrangements.

A method for gesture recognition according to embodiments includes detecting one or more gesture-related signals using the associated plurality of detection sensors; and evaluating a gesture detected from the one or more gesture-related signals using an automatic recognition technique to determine if the gesture corresponds to one of a predetermined set of gestures. In some embodiments, a start of the gesture is determined if the distance between the target object and at least one sensor decreases and the distance between the target object and at least one sensor increases, and a short term variance or an equivalent measure over a predetermined plurality of signal samples is less than a threshold. In some embodiments, a stop of a the gesture is determined if at a given time the distances between the target object and all sensors decrease, and/or a short term variance or an equivalent measure over a predetermined plurality of signal samples is less than a threshold, and/or the signal changes are less than a predetermined threshold for a predetermined plurality of signal samples after the given time.

In some embodiments, each gesture is represented by one or more Hidden Markov Models (HMM). In some embodiments, evaluating a gesture includes evaluating a probability measure for one or more HMMs. In some embodiments, the features to which the HMMs' observation matrices are associated are non-quantized or quantized sensor signal levels, x/y/z position, distances, direction, orientation, angles and/or $1^{st}$, $2^{nd}$ or higher other derivatives of these with respect to time, or any combination thereof. In some embodiments, the features are the $1^{st}$ derivatives of the sensor signal levels quantized to two quantization levels.

A system for gesture recognition according to embodiments includes a sensor arrangement for detecting one or more gesture-related signals using the associated plurality of detection sensors; and a module for evaluating a gesture detected from the one or more gesture-related signals using an automatic recognition technique to determine if the gesture corresponds to one of a predetermined set of gestures.

In some embodiments, a start of the gesture is determined if the distance between the target object and at least one sensor decreases and the distance between the target object and at least one sensor increases and a short term variance or an equivalent measure over a predetermined plurality of signal samples is less than a threshold. In some embodiments, a stop of the gesture is determined if at a given time, the distances between the target object and all sensors decrease and/or a short term variance or an equivalent measure over a predetermined plurality of signal samples is less than a threshold, and/or the signal changes are less than a predetermined threshold for a predetermined plurality of signal samples after the given time.

A computer readable medium according to embodiments includes one or more non-transitory machine readable program instructions for receiving one or more gesture-related signals using a plurality of detection sensors; and evaluating a gesture detected from the one or more gesture-related signals using an automatic recognition technique to determine if the gesture corresponds to one of a predetermined set of gestures.

In some embodiments, a start of a gesture is determined if the distance between the target object and at least one sensor decreases and the distance between the target object and at least one sensor increases, and a short term variance or an equivalent measure over a predetermined plurality of signal samples is less than a threshold. In some embodiments, a stop of the gesture is determined if at a given time, the distances between the target object and all sensors decrease and/or a short term variance or an equivalent measure over a predetermined plurality of signal samples is less than a threshold, and/or the signal changes are less than a predetermined threshold for a predetermined plurality of signal samples after the given time.

BRIEF DESCRIPTION OF THE DRAWINGS

The drawings accompanying and forming part of this specification are included to depict certain aspects of the disclosure. It should be noted that the features illustrated in the drawings are not necessarily drawn to scale. A more complete understanding of the disclosure and the advantages thereof may be acquired by referring to the following description, taken in conjunction with the accompanying drawings in which like reference numbers indicate like features and wherein:

FIG. 4 illustrates exemplary defined gestures.

FIG. 5A illustrates an exemplary Hidden Markov Model observation probability matrix for a check gesture.

FIG. 5B illustrates an exemplary check gesture.

FIG. 6A illustrates exemplary determination of a start event.

FIG. 6B illustrates an exemplary clockwise circular gesture.

FIG. 7 illustrates exemplary stop criteria.

FIG. 9 illustrates initial state distributions and transition matrices for exemplary linear and circular Hidden Markov Models.

FIG. 11 illustrates exemplary circle gesture and resulting feature vectors.

FIG. 12 illustrates exemplary test results of gesture recognition according to embodiments.

DETAILED DESCRIPTION

The disclosure and various features and advantageous details thereof are explained more fully with reference to the exemplary, and therefore non-limiting, embodiments illustrated in the accompanying drawings and detailed in the following description. It should be understood, however, that the detailed description and the specific examples, while indicating the preferred embodiments, are given by way of illustration only and not by way of limitation. Descriptions of known programming techniques, computer software, hardware, operating platforms and protocols may be omitted so as not to unnecessarily obscure the disclosure in detail. Various substitutions, modifications, additions and/or rearrangements within the spirit and/or scope of the underlying inventive concept will become apparent to those skilled in the art from this disclosure.

According to embodiments, systems are provided with a reliable automatic recognition of predefined hand gestures performed in front of a sensor system with two or more sensor electrodes providing their measurement data. According to embodiments, the recognition is invariant to translation and/or scaling of the gestures and for a large range of z-axis distances between finger/hand and the respective sensor system. According to various embodiments, a Hidden Markov recognizer with improved feature extraction and gesture detection for hand gesture recognition can be provided.

Although for sake of convenience, embodiments are described in the context of a capacitive sensor system, any suitable sensor system that can provide distance or depth information may be employed. Further, though embodiments are described in the context of a three dimensional (x/y/z) sensor system, the proposed method for gesture recognition is also applicable to two dimensional sensor systems (z=0). Examples of suitable sensors systems include, but are not limited to, those based on resistive, capacitive (e.g., surface capacitive, projected capacitive, mutual capacitive, or self capacitive), surface acoustic wave, infrared, optical or video imaging, one or more photo diodes, dispersive signal, ultrasonic, and acoustic pulse recognition sensor technology. Thus, the figures are exemplary only.

Figure 1:
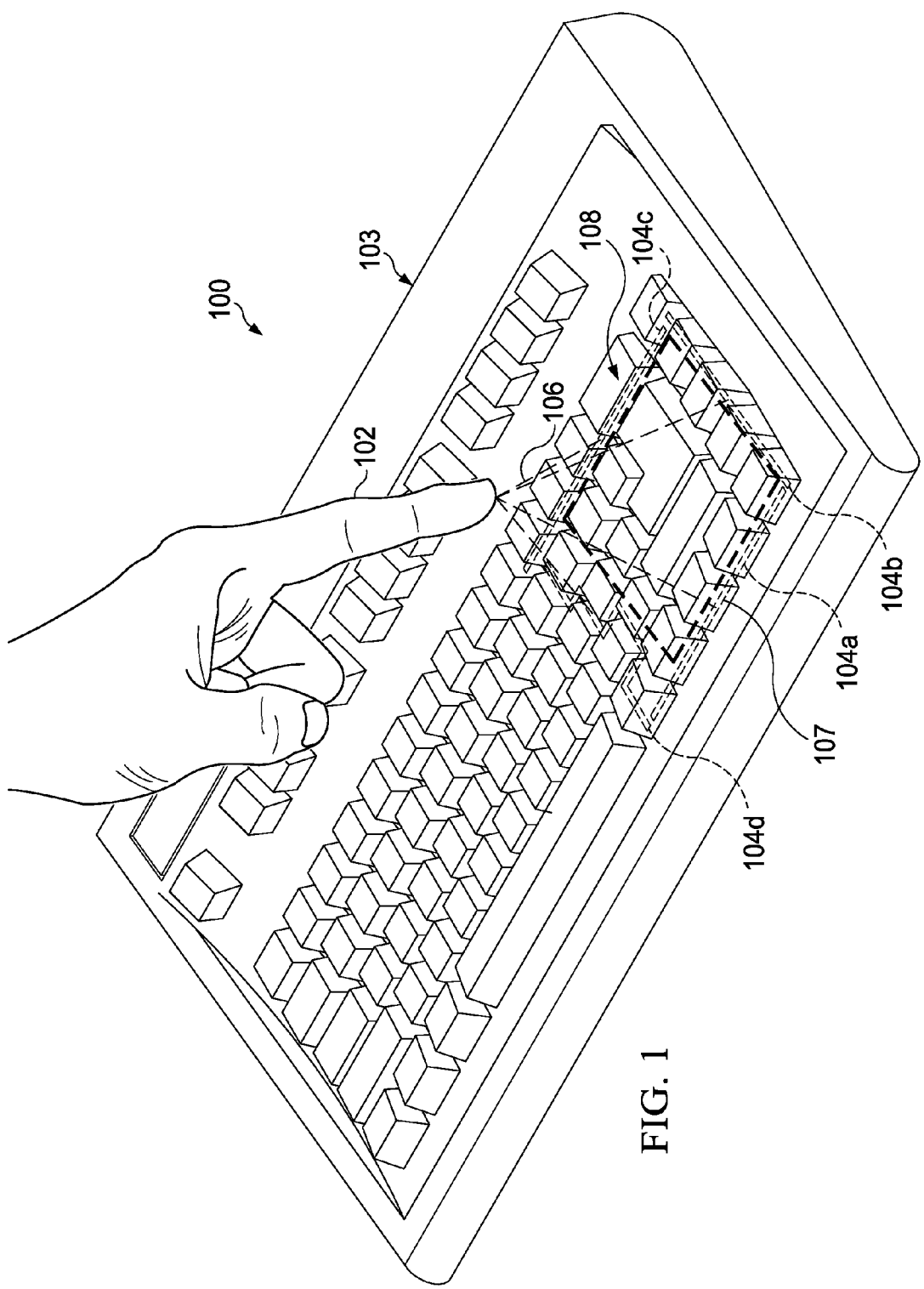
FIG. 1 is a diagram schematically illustrating a keyboard including an exemplary capacitive sensing system.

Turning now to the drawings, and with particular attention to FIG. 1, a sensor configuration is shown and generally identified by the reference numeral 100. More particularly, FIG. 1 illustrates a user input object such as a human finger 102 over a PC keyboard 103 with an inbuilt sensor system, such as a capacitive sensor system. The regions 104a-104d identify the sensor electrodes' positions underneath the keys. Lines 106 between the finger 102 and the rectangular areas 104a-104d indicate the shortest paths from the fingertip to the sensor electrodes. The rectangular area 107 limited in x/y dimension by the regions 104a-104d is denoted as the 'active area', and the cuboid-shape space above the active area 108 is denoted as the 'active space'.

It is noted that, while illustrated as a sensor system embedded in a stand-alone keyboard, embodiments may be employed with sensor systems associated with an electronic device that is itself a user interface or comprises a user interface, such as a mobile phone, an mp3 player, a PDA, a tablet computer, a computer, a remote control, a radio, a computer mouse, a touch-sensitive display, and a television. A user input object may be anything like a stylus (e.g., a small pen-shaped instrument) or a digital pen. A user input object in this sense may also be a user's hand or finger.

Figure 2:
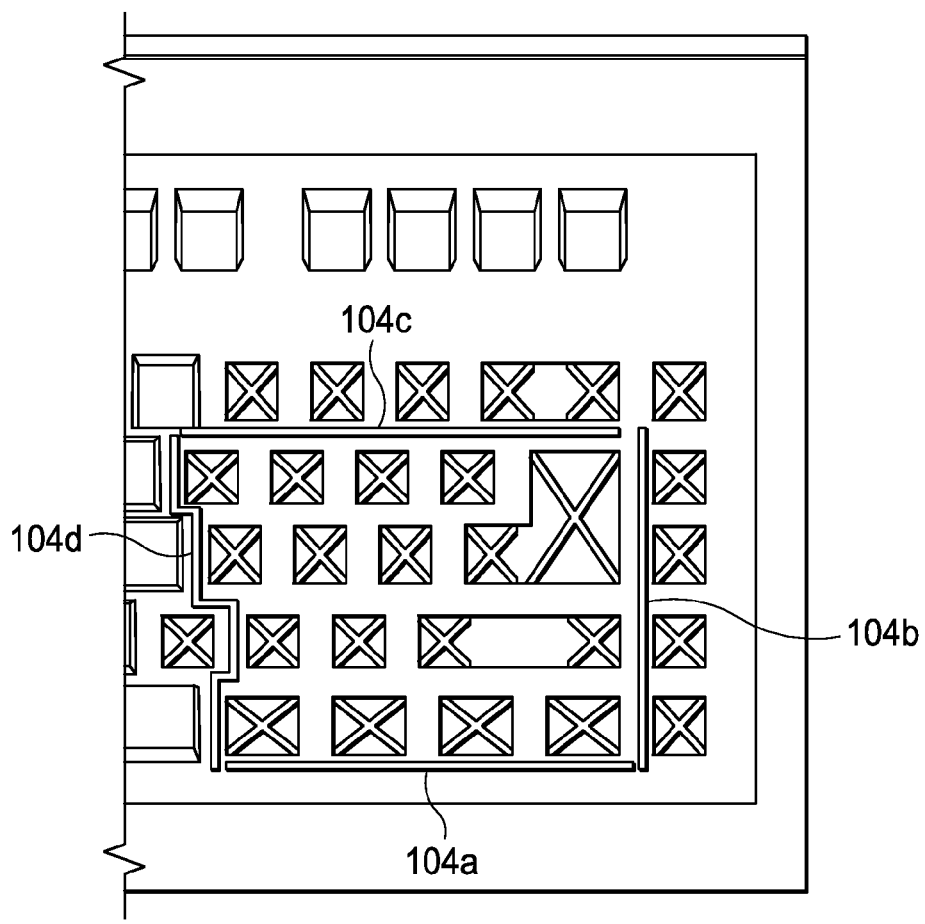
FIG. 2 is a diagram illustrating the electrode layout for an exemplary capacitive sensing system.

FIG. 2 illustrates the keyboard 103 with some of the keys removed, showing the sensor system in greater detail. In particular, shown is an underlying printed circuit board carrying the sensor system with bottom (EB) 104a, left (EL) 104d, top (ET) 104c, and right (ER) 104b electrodes.

Figure 3:
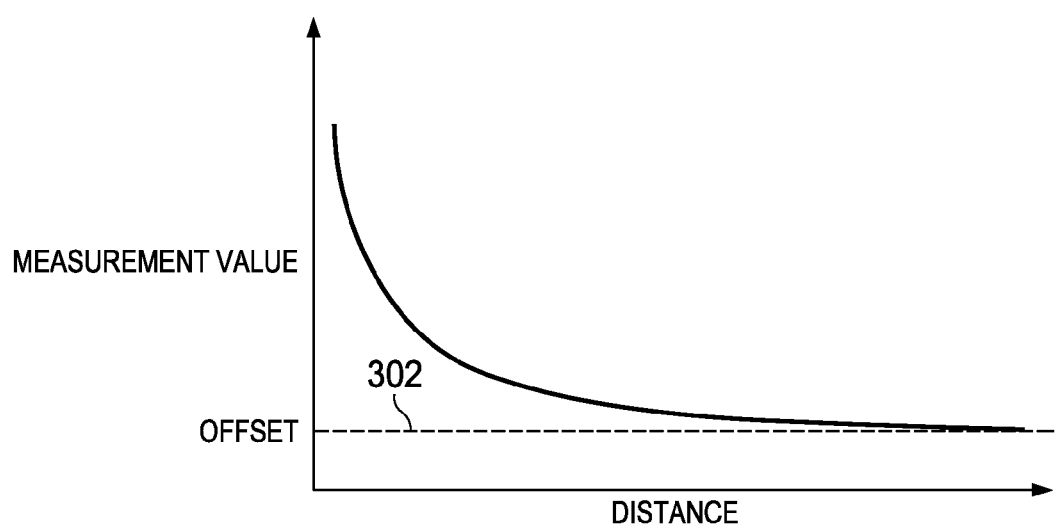
FIG. 3 illustrates the relationship between finger-to-electrode distance and measurement value of electrode signals.

FIG. 3 qualitatively shows the magnitude of a sensor's measurement value (vertical axis) as a function of the distance between sensor electrode and fingertip (horizontal axis). The larger the distance, the smaller the measurement value. For equivalent embodiments of this invention, the sensor value can increase with the distance. The asymptotic offset 302 for the distance growing towards infinity is generally unknown and may also change over time.

In some embodiments, the sensor system provides discrete time measurement values for each sensor electrode at a predetermined sampling rate f_s. Typically, in a pre-processing stage, the sensor signals are low-pass filtered in order to match the frequency range of hand gestures which are typically up to f_max=<15-20 Hz, depending on the application, wherein f_s>2*f_max. Given these signals for one or more electrodes, the goal is to provide reliable automatic recognition of hand gestures performed over the keyboard or the active area, respectively.

In FIG. 4, according to an embodiment, eight specific example gestures are defined. However, according to other embodiments, other gestures may be defined. In the example illustrated, the gestures are four "flicks," i.e., fast linear finger movements in the four main directions (right 402, left 404, up 406, down 408), circles clockwise 410 and counter-clockwise 412, a 'confirm' or 'check' gesture 414, and a cancel gesture 416, which is a sequence of consecutive, short left<->right movements.

A common approach in pattern recognition such as automatic speech recognition and hand-writing recognition is to use Hidden Markov Models (HMMs) and trellis computations for estimating the most likely of a pre-defined set of phonemes, words or letters, respectively. A HMM $\lambda:=(A,B,\pi)$ is a finite stochastic state machine with N states which can produce M output symbols or "features". It is described by three parameters: The state transition probability distribution matrix A of size N×N, the N×M symbol probability distribution matrix B which contains the probability for each state-feature map, and the N×1 initial state distribution vector $\pi$. A trellis is a graph which adds the time dimension to a state diagram and allows for efficient computations. Although the embodiments discussed herein relate to first order HMMs, in other embodiments, higher order HMMs may be used.

In gesture recognition, for example, each HMM represents a gesture. A gesture may be divided into gesture fragments whose features are represented by the states in its assigned HMM. From the sensor signals detected while performing a gesture, features are extracted, typically at equidistant discrete-time instances. Such features comprise, for example, the non-quantized or quantized signal levels, x/y/z position, distances, direction, orientation, angles and/or $1^{st}$, $2^{nd}$ or higher order derivatives of these with respect to time, or any combination thereof. If, for example, the utilized feature is the first derivative of the x/y position with respect to time, i.e., the x/y velocity, then the feature sequence obtained while detecting a gesture is a sequence of x/y velocity vectors. The length of this sequence depends on the temporal duration of the gesture. When different people perform the same gesture, e.g., a "check" gesture in front of a sensor system, the duration of the gesture, speed of movement and/or the gesture's shape may differ slightly. Hence there will also be variations in the corresponding feature sequences.

An HMM can incorporate these variations as at each time instance it does not only represent a single feature, but a probability distribution over all possible feature vectors. In order to obtain these probability distribution matrices B, as well as the probabilities for transitions between its states, each HMM needs to be trained with the feature sequences of a so-called training gesture set. During the training the HMM probability distributions are optimized in order to maximize the conditional probability of the training sequences given this HMM. Hence, the HMM is representing the feature sequences of all gestures it was trained with. The number of states N necessary for an HMM depends, among others, on the complexity of the corresponding gesture. As to each state, it belongs a single observation probability distribution (row in matrix B), the more different features there are in a feature sequence of a gesture, the more states are required to represent it. Additional details on use of Hidden Markov Models in gesture recognition may be found in commonly-assigned, U.S. Pat. No. 8,280,732, titled "System and Method for Multidimensional Gesture Analysis," which is hereby incorporated by reference in its entirety as if fully set forth herein.

Figure 8:
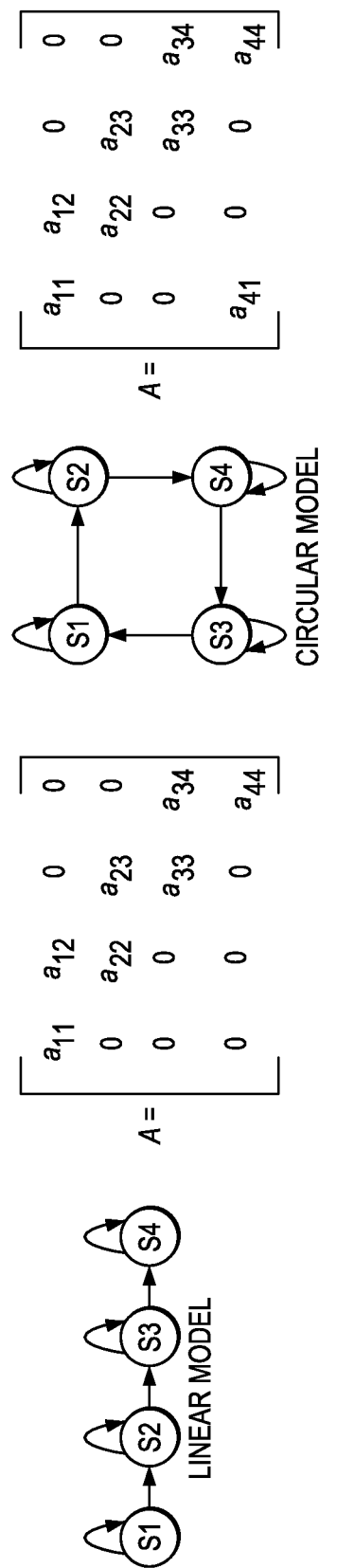
FIG. 8 illustrates state diagrams and state transition probability matrices of exemplary linear and circular Hidden Markov Models.

Depending on the application, different HMM model topologies are possible, for example, linear models (often used in speech recognition, with state transitions only to the current or the next state) or circular models (often used in image processing; the last state has a non-zero transition probability to the first state) as shown in FIG. 8.

According to embodiments, for gestures with a distinct start and end point like flicks 402, 404, 406, 408 and confirm gesture 414 (FIG. 4), linear models are preferred. For gestures with non-distinct start and endpoint like circles 410, 412 and the cancel gesture 414, circular models are preferred. In addition, fully connected models with non-zero transition probabilities between all states can, for example, be used for a so-called "garbage" HMM for gestures that should be rejected.

A frequently used HMM initialization before training is shown in FIG. 9, revealing the linear and circular characteristic in the state transition matrices A. During the HMM training, the non-zero entries of the A and B matrices will change. However, the zero entries will remain as such, and hence the model topology, too.

Input to both a training algorithm, which optimizes the matrices A and B for each gesture, as well as to a recognition algorithm, are temporal sequences of features, where each sequence corresponds to one execution of a gesture.

The knowledge of the time of start and stop of a gesture may be important for the recognition performance. Various embodiments, then, use a combination of start/stop criteria and a signal feature which is very simple, yet invariant to scaling and transition, and thus very robust, for use with (though not limited to) HMMs.

FIGS. 5A and 5B show an example of a feature sequence for a "check" gesture and exemplary sensors EB, EL, ET, ER, where the feature vector consists of the $1^{st}$ derivative of the distances between fingertip and the four sensor electrodes with respect to time. Each column in the feature sequence matrix in FIG. 5A corresponds to a discrete-time instance. For example, the value "−4.1" in position (2,2) of the matrix indicates a relatively fast moving away from electrode E2 at time instance 2, and at the same time the value "0.4" in row 4 indicates a relatively slow movement towards electrode E4.

For the detection of the start and stop of a gesture, the following working assumptions can be made: A) A gesture either begins when entering the active space (or active area in the case of z=0) from outside, OR with the start of movement after a resting period within the active space (i.e. the finger does not have to leave the active space between gestures). B) A gesture ends when resting within the active space or when leaving it, or when the probability for the performed gesture to be one of the pre-defined set of gestures exceeds a threshold.

As mentioned above, from these assumptions criteria for start and stop detection are directly deduced.

Start Detection:

A1) The distance between fingertip and at least one sensor increases AND the distance between fingertip and at least one sensor decreases (or the signal level of at least one electrode increases AND the signal level of at least one other electrode decreases). (Movement of the hand within the active space at a constant z-height always leads to a distance increase to at least one electrode and a distance decrease to at least one other electrode.) For Z=0, the 3D recognition problem is a 2D touch gesture recognition problem. Detecting an increase or decrease may include detecting a threshold distance or signal level change.

A2) The short-time variance or a similar measure of the sensor signal over, for example, 10 signal samples must exceed a threshold (finger is moving sufficiently fast). If both criteria are fulfilled simultaneously, the start of a gesture is assumed to be detected. The start detection can be validated by checking above (or similar) criteria again shortly after the detected gesture start. If the validation is negative, the gesture recognition is aborted.

Stop Detection:

B1) The hand to electrode distances increase for all electrodes (or the signal levels of all sensors decrease) over, for example, nD=10 samples. (This is not possible for movement within the active space at a constant z-distance.)

B2) The short-time variance or a similar measure of the sensor signal over, for example, nV=10 signal samples must not exceed a threshold (finger is moving sufficiently slow).

B3) If criterion B1) or B2) is fulfilled at discrete time instance T_E, then the gesture end is detected to be at time T_E-nD or T_E-nV, respectively.

Gestures can be excluded from the set of possible gestures if the time between start and stop of a gesture is not within a predefined time interval.

FIG. 6A shows the determination of a start event for the clockwise circle gesture shown in FIG. 6B, wherein the following criteria apply: A1) a signal level of >=1 electrode increases AND a signal level of >=1 other electrode decreases (which corresponds to a finger moving within the active space). A2) A short time variance or a similar measure of the sensor signal exceeds a threshold (finger is moving sufficiently fast).

FIG. 7 shows the gesture stop detection as criterion B1) applies: The signal levels of all electrodes decrease (this corresponds to a finger leaving active space).

Figure 10:
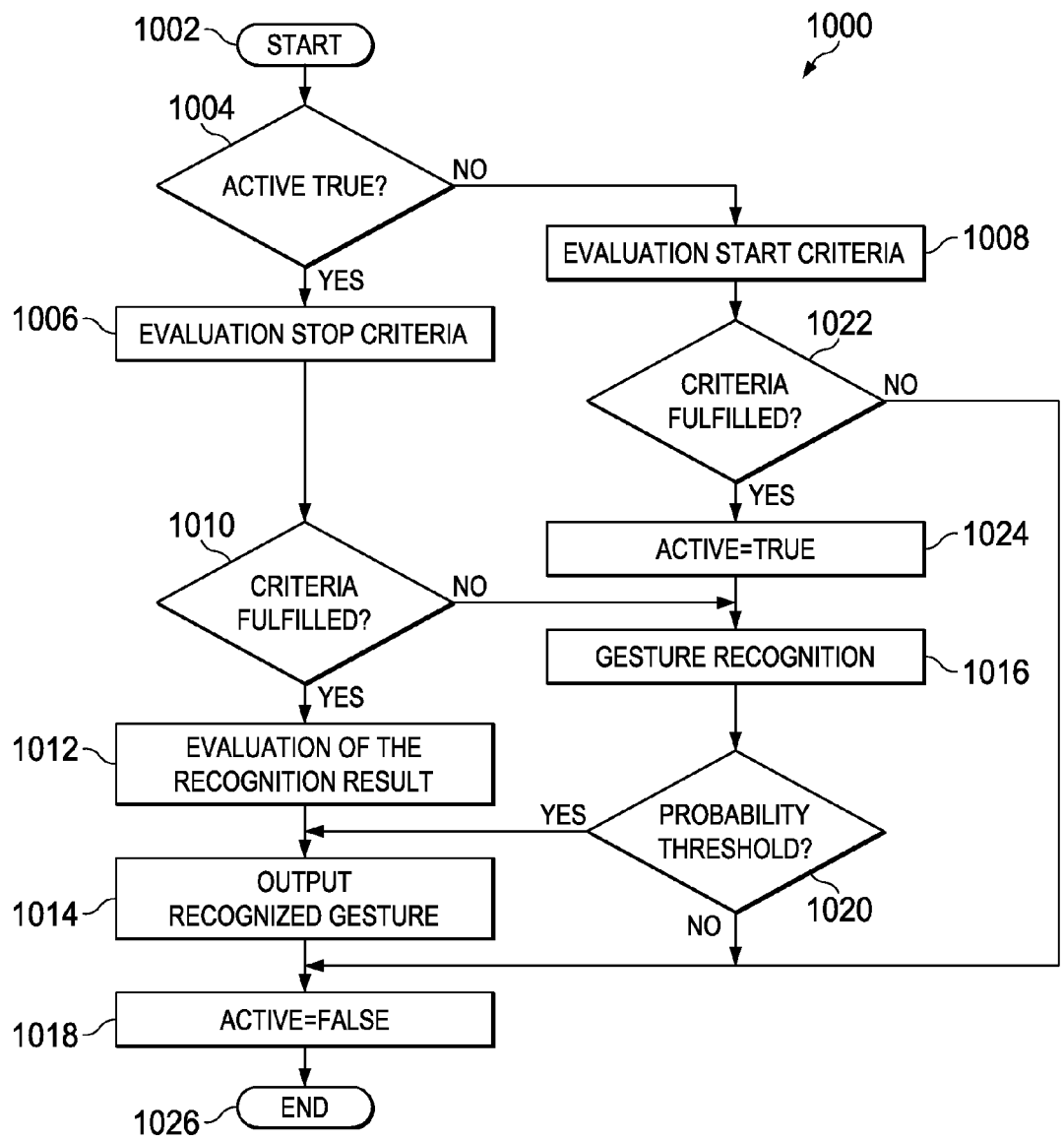
FIG. 10 is a flowchart illustrating process flow according to embodiments.

FIG. 10 is a flowchart 1000 illustrating the overall gesture recognition process including start/stop detection. Upon a start 1004 of the process, for each incoming signal sample (consisting of sensor values from all electrodes), it is first checked whether the gesture recognition with computation of HMM probabilities is already running (ACTIVE=true) or not (ACTIVE=false) (step 1004). In the latter case, the start criteria are evaluated (step 1008). If the start criteria are fulfilled (as determined at step 1022), then the ACTIVE flag is set 'true' (step 1024) and the actual gesture recognition starts (step 1016). The probability of exceeding the threshold is determined (step 1020); if the criteria are fulfilled, the recognized gesture is output (step 1014) and ACTIVE is set to false (step 1018). Otherwise, the process ends (step 1026).

If ACTIVE is true for an incoming sample (step 1004), then the stop criteria are evaluated (step 1006). If the stop criteria are fulfilled (step 1010), the gesture recognition is completed, its result evaluated (step 1012) and output (step 1014), and ACTIVE is set to false (step 1018). Otherwise, gesture recognition proceeds (step 1016).

FIG. 11 shows an example for a finger drawing a clockwise circle at constant z-distance above the active area, and the resulting feature vectors, being the change of signal level for all electrodes. In time step 1, the finger moves towards the electrodes ER and EB, and away from the electrodes EL and ET.

This leads to an increase in the signal levels of the electrodes ER and EB, and a decrease in the signal levels of the electrodes EL and ET. In time step 3 the finger still moves away from ET and towards EL, but now away from ER and towards EL. This leads to an increase in the signal levels of the electrodes EB and EL and to a decrease in the signals of the electrodes ET and ER, and so on.

According to some embodiments, for performance evaluation, the HMMs (i.e. each gesture) were trained with data from one set of people who performed each gesture a defined number of times. For the training of HMMs, reference is made to L. R. Rabiner: "A tutorial on Hidden Markov Models and selected applications in speech recognition". Proceedings of the IEEE, Vol. 77 No. 2, February 1989.

To evaluate the recognition rate objectively, an additional test gesture database was taken from another, disjunct set of people. The achieved gesture recognition rates (in percent) are shown in FIG. 12. The rows of the matrix show the performed gestures and the columns show the recognized gestures. The column "Rejected" shows the rejected gestures. The garbage model represents all unintended and not defined hand movements. It is trained with all the training data of all people of the first set of people, i.e. all their gestures. The column "Sum" shows the sum of the probabilities of all the recognized gestures and therefore must be 100. For all defined gestures, recognition rates of at least 95% could be achieved. Many of the unrecognized gestures were rejected, which is advantageous, since a false detection of a different gesture is considered more inconvenient than a rejection.

The proposed method is not only limited to sensor systems with exactly four electrodes/sensors or the electrode layout as in FIG. 1 or 2. It applies to systems with any multitude of sensors, i.e. 2 up to infinity. For example, it can also be a system with only two electrodes, a left electrode EL and a right electrode ER, which are of round shape or another shape.

Instead of comparing the short-time variance of the sensor signals with a threshold for each channel, it is also possible to compare a weighted sum of these variances with a single threshold or use any other measure of the signal representing active movement.

The various embodiments are applicable to any sensor system whose sensors provide distance dependent measurement data. Such systems include capacitive and resistive touch sensors, ultrasonic sensors, radar, surface acoustic sensors. The disclosed embodiments are not limited to gesture recognition using HMMs, but can also be used with Dynamic Time Warping, Neural Networks or other automatic recognition techniques.

Figure 13:
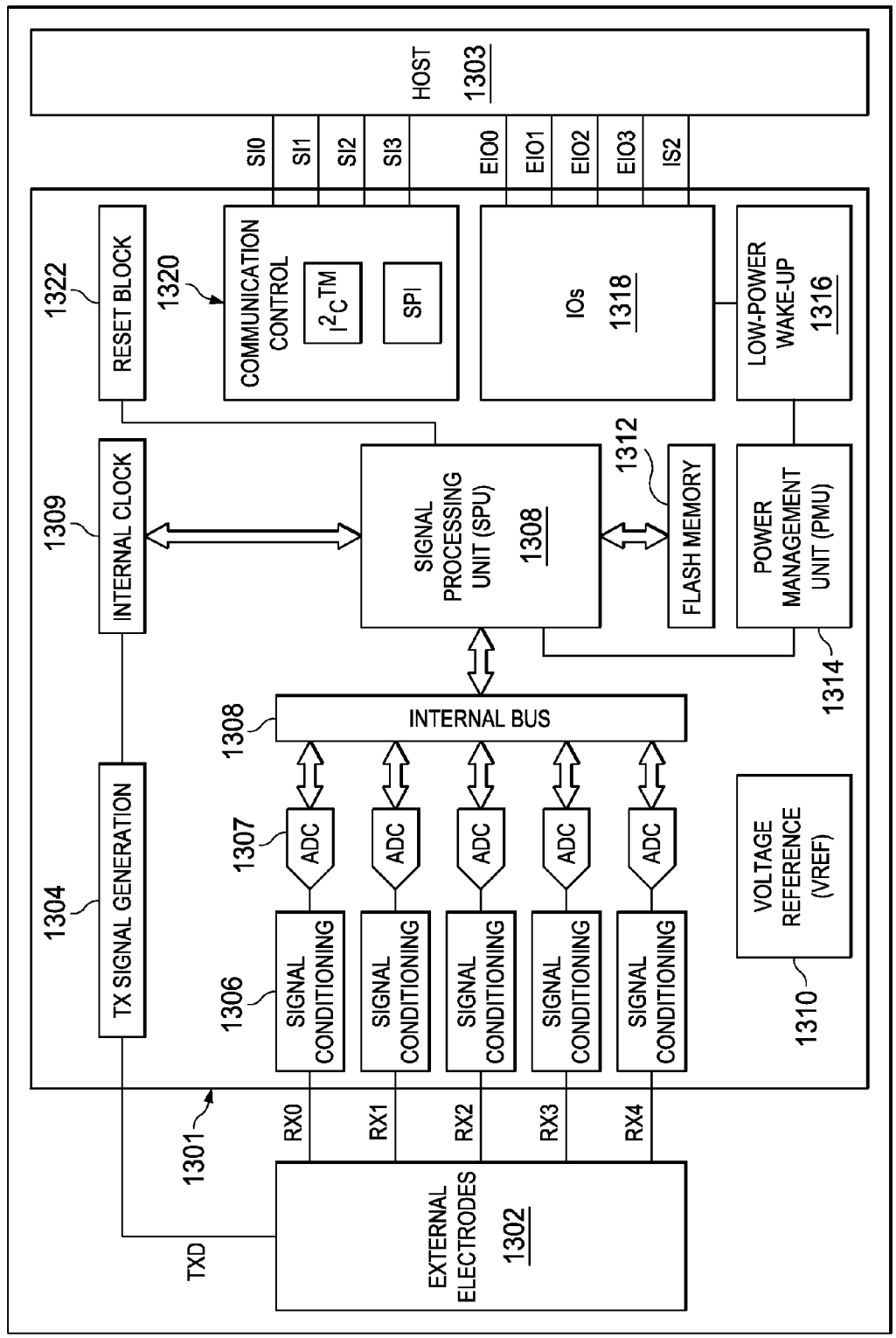
FIG. 13 illustrates an exemplary system according to embodiments.

Turning now to FIG. 13, a block diagram illustrating a particular implementation of a sensor system 1300 for gesture recognition including start/stop detection according to embodiments. The system of FIG. 13 may be particularly useful in a capacitive sensing system. The system 1300 includes a sensing controller 1301, sensing electrodes 1302, and a host system 1303. The sensing electrodes 1302 may implement a configuration such as shown in FIG. 1. The host 1303 may be any system that can make use of touch sensor signals, such as cell phones, laptop computers, I/O devices, light switches, coffee machines, medical input devices, and the like.

In the example illustrated, a TX signal generator 1304 provides a transmitter signal $V_{TX}$ to the transmit electrode TXD. Receive electrodes RX0-RX4 are received at signal conditioning modules 1306 for implementing filtering, etc. The outputs of signal conditioning are provided to ADCs 1307 and, via a bus 1308, to a signal processing unit 1308. The signal processing unit 1308 may implement the functionality of the gesture recognition. Resulting outputs may be provided via IO unit 1318 to the host 1303.

The system may further include a variety of additional modules, such as internal clock 1309, memory such as flash memory 1312, a voltage reference 1310, power management 1314, low-power wake-up 1316, reset control 1322, and communication control 1320.

The following references provide additional information on the use of Hidden Markov Models:

L. E. Baum et al: "A maximization technique occurring in the statistical analysis of probabilistic functions of Markov chains", Ann. Math. Statist. vol. 41. no. 1. pp. 164-171, 1970.

E. Behrends: Introduction to Markov Chains, Viehweg Verlag, 2000.

L. R. Rabiner: "A tutorial on Hidden Markov Models and selected applications in speech recognition". Proceedings of the IEEE, Vol. 77 No. 2, February 1989.

A. J. Viterbi: "Error bounds for convolutional codes and an asymptotically optimum decoding algorithm". IEEE Transactions on Information Theory, Vol. 13, April 1967.

Welch: "Hidden Markov Models and the Baum-Welch Algorithm". IEEE Information Theory Society Newsletter, December 2003.

Although the invention has been described with respect to specific embodiments thereof, these embodiments are merely illustrative, and not restrictive of the invention. The description herein of illustrated embodiments of the invention, including the description in the Abstract and Summary, is not intended to be exhaustive or to limit the invention to the precise forms disclosed herein (and in particular, the inclusion of any particular embodiment, feature or function within the Abstract or Summary is not intended to limit the scope of the invention to such embodiment, feature or function). Rather, the description is intended to describe illustrative embodiments, features and functions in order to provide a person of ordinary skill in the art context to understand the invention without limiting the invention to any particularly described embodiment, feature or function, including any such embodiment feature or function described in the Abstract or Summary. While specific embodiments of, and examples for, the invention are described herein for illustrative purposes only, various equivalent modifications are possible within the spirit and scope of the invention, as those skilled in the relevant art will recognize and appreciate. As indicated, these modifications may be made to the invention in light of the foregoing description of illustrated embodiments of the invention and are to be included within the spirit and scope of the invention. Thus, while the invention has been described herein with reference to particular embodiments thereof, a latitude of modification, various changes and substitutions are intended in the foregoing disclosures, and it will be appreciated that in some instances some features of embodiments of the invention will be employed without a corresponding use of other features without departing from the scope and spirit of the invention as set forth. Therefore, many modifications may be made to adapt a particular situation or material to the essential scope and spirit of the invention.

Reference throughout this specification to "one embodiment", "an embodiment", or "a specific embodiment" or similar terminology means that a particular feature, structure, or characteristic described in connection with the embodiment is included in at least one embodiment and may not necessarily be present in all embodiments. Thus, respective appearances of the phrases "in one embodiment", "in an embodiment", or "in a specific embodiment" or similar terminology in various places throughout this specification are not necessarily referring to the same embodiment. Furthermore, the particular features, structures, or characteristics of any particular embodiment may be combined in any suitable manner with one or more other embodiments. It is to be understood that other variations and modifications of the embodiments described and illustrated herein are possible in light of the teachings herein and are to be considered as part of the spirit and scope of the invention.

In the description herein, numerous specific details are provided, such as examples of components and/or methods, to provide a thorough understanding of embodiments of the invention. One skilled in the relevant art will recognize, however, that an embodiment may be able to be practiced without one or more of the specific details, or with other apparatus, systems, assemblies, methods, components, materials, parts, and/or the like. In other instances, well-known structures, components, systems, materials, or operations are not specifically shown or described in detail to avoid obscuring aspects of embodiments of the invention. While the invention may be illustrated by using a particular embodiment, this is not and does not limit the invention to any particular embodiment and a person of ordinary skill in the art will recognize that additional embodiments are readily understandable and are a part of this invention.

Any suitable programming language can be used to implement the routines, methods or programs of embodiments of the invention described herein, including C, C++, Java, assembly language, etc. Different programming techniques can be employed such as procedural or object oriented. Any particular routine can execute on a single computer processing device or multiple computer processing devices, a single computer processor or multiple computer processors. Data may be stored in a single storage medium or distributed through multiple storage mediums, and may reside in a single database or multiple databases (or other data storage techniques). Although the steps, operations, or computations may be presented in a specific order, this order may be changed in different embodiments. In some embodiments, to the extent multiple steps are shown as sequential in this specification, some combination of such steps in alternative embodiments may be performed at the same time. The sequence of operations described herein can be interrupted, suspended, or otherwise controlled by another process, such as an operating system, kernel, etc. The routines can operate in an operating system environment or as stand-alone routines. Functions, routines, methods, steps and operations described herein can be performed in hardware, software, firmware or any combination thereof.

Embodiments described herein can be implemented in the form of control logic in software or hardware or a combination of both. The control logic may be stored in an information storage medium, such as a computer-readable medium, as a plurality of instructions adapted to direct an information processing device to perform a set of steps disclosed in the various embodiments. Based on the disclosure and teachings provided herein, a person of ordinary skill in the art will appreciate other ways and/or methods to implement the invention.

It is also within the spirit and scope of the invention to implement in software programming or code any of the steps, operations, methods, routines or portions thereof described herein, where such software programming or code can be stored in a computer-readable medium and can be operated on by a processor to permit a computer to perform any of the steps, operations, methods, routines or portions thereof described herein. The invention may be implemented by using software programming or code in one or more general purpose digital computers, by using application specific integrated circuits, programmable logic devices, field programmable gate arrays, and so on. Optical, chemical, biological, quantum or nanoengineered systems, components and mechanisms may be used. In general, the functions of the invention can be achieved by any means as is known in the art. For example, distributed, or networked systems, components and circuits can be used. In another example, communication or transfer (or otherwise moving from one place to another) of data may be wired, wireless, or by any other means.

A "computer-readable medium" may be any medium that can contain, store, communicate, propagate, or transport the program for use by or in connection with the instruction execution system, apparatus, system or device. The computer readable medium can be, by way of example only but not by limitation, an electronic, magnetic, optical, electromagnetic, infrared, or semiconductor system, apparatus, system, device, propagation medium, or computer memory. Such computer-readable medium shall generally be machine readable and include software programming or code that can be human readable (e.g., source code) or machine readable (e.g., object code). Examples of non-transitory computer-readable media can include random access memories, read-only memories, hard drives, data cartridges, magnetic tapes, floppy diskettes, flash memory drives, optical data storage devices, compact-disc read-only memories, and other appropriate computer memories and data storage devices. In an illustrative embodiment, some or all of the software components may reside on a single server computer or on any combination of separate server computers. As one skilled in the art can appreciate, a computer program product implementing an embodiment disclosed herein may comprise one or more non-transitory computer readable media storing computer instructions translatable by one or more processors in a computing environment.

A "processor" includes any, hardware system, mechanism or component that processes data, signals or other information. A processor can include a system with a general-purpose central processing unit, multiple processing units, dedicated circuitry for achieving functionality, or other systems. Processing need not be limited to a geographic location, or have temporal limitations. For example, a processor can perform its functions in "real-time," "offline," in a "batch mode," etc. Portions of processing can be performed at different times and at different locations, by different (or the same) processing systems.

As used herein, the terms "comprises," "comprising," "includes," "including," "has," "having," or any other variation thereof, are intended to cover a non-exclusive inclusion. For example, a process, product, article, or apparatus that comprises a list of elements is not necessarily limited only those elements but may include other elements not expressly listed or inherent to such process, process, article, or apparatus.

Furthermore, the term "or" as used herein is generally intended to mean "and/or" unless otherwise indicated. For example, a condition A or B is satisfied by any one of the following: A is true (or present) and B is false (or not present), A is false (or not present) and B is true (or present), and both A and B are true (or present). As used herein, including the claims that follow, a term preceded by "a" or "an" (and "the" when antecedent basis is "a" or "an") includes both singular and plural of such term, unless clearly indicated within the claim otherwise (i.e., that the reference "a" or "an" clearly indicates only the singular or only the plural). Also, as used in the description herein and throughout the claims that follow, the meaning of "in" includes "in" and "on" unless the context clearly dictates otherwise.

It will be appreciated that one or more of the elements depicted in the drawings/figures can also be implemented in a more separated or integrated manner, or even removed or rendered as inoperable in certain cases, as is useful in accordance with a particular application. Additionally, any signal arrows in the drawings/Figures should be considered only as exemplary, and not limiting, unless otherwise specifically noted.

What is claimed is:

1. A method for touchless gesture recognition comprising: detecting one or more gesture-related signals using an associated plurality of detection sensors; and evaluating the touchless gesture detected from the one or more gesture-related signals using an automatic recognition technique to determine if the touchless gesture corresponds to one of a predetermined set of gestures, wherein in determining a start of the gesture, a start is determined if the distance between the target object and at least one sensor decreases and the distance between the target object and at least another sensor increases, and a short term variance or an equivalent measure over a predetermined plurality of signal samples is less than a threshold.

2. A method in accordance with claim 1, wherein evaluating the gesture includes determining a stop of a gesture.

3. A method in accordance with claim 1, wherein a stop of a the gesture is determined if at a given time the distances between the target object and all sensors decrease, and/or a short term variance or an equivalent measure over a predetermined plurality of signal samples is less than a threshold, and/or the signal changes are less than a predetermined threshold for a predetermined plurality of signal samples after the given time.

4. A method in accordance with claim 1, wherein each gesture is represented by one or more Hidden Markov Models (HMM).

5. A method in accordance with claim 4, wherein evaluating a gesture includes evaluating probability measures for one or more HMMs.

6. A method in accordance with claim 4, wherein features to which observation matrices of the one or more HMMs are associated are non-quantized or quantized sensor signal levels, x/y/z position, distances, direction, orientation, angles and/or $1^{st}$, $2^{nd}$ or higher order derivatives of these with respect to time, or any combination thereof.

7. A method in accordance with claim 4, wherein features to which observation matrices of the one or more HMMs are associated are the $1^{st}$ derivatives of sensor signal levels quantized to two quantization levels.

8. A method in accordance with claim 5, wherein for each new signal sample or feature, the probability of each Hidden Markov Model is updated.

9. A method in accordance with claim 8, wherein if the probability of a Hidden Markov Model exceeds a pre-defined threshold, the recognition is stopped.

10. A system for gesture recognition using an alternating electric field generated by a sensor arrangement and associated detection electrodes, wherein a gesture is performed without touching a surface, wherein electrode signals are evaluated using Hidden Markov Models, wherein start and stop criteria for determination of a gesture are determined, and wherein feature sequences used to evaluate the Hidden Markov Models' probabilities are the $1^{st}$ derivatives of sensor signal levels quantized to two quantization levels.

11. A system for gesture recognition comprising: a sensor arrangement for detecting one or more gesture-related signals using an associated plurality of detection sensors; and a module for evaluating a touchless gesture detected from the one or more gesture-related signals using an automatic recognition technique to determine if the gesture corresponds to one of a predetermined set of gestures, wherein a start of the gesture is determined if the distance between the target object and at least one sensor decreases and the distance between the target object and at least one sensor increases and a short term variance or an equivalent measure over a predetermined plurality of signal samples is less than a threshold.

12. A system in accordance with claim 11, wherein a stop of the gesture is determined if at a given time, the distances between the target object and all sensors decrease and/or a short term variance or an equivalent measure over a predetermined plurality of signal samples is less than a threshold, and/or the signal changes are less than a predetermined threshold for a predetermined plurality of signal samples after the given time.

13. A system in accordance with claim 11, wherein each gesture is represented by one or more Hidden Markov Models.

14. A system in accordance with claim 13, wherein evaluating a gesture includes evaluating probability measures for one or more Hidden Markov Models.

15. A system in accordance with claim 13, wherein the features to which observation matrices of the one or more HMMs are associated are non-quantized or quantized sensor signal levels, x/y/z position, distances, direction, orientation, angles and/or $1^{st}$, $2^{nd}$ or higher order derivatives of these with respect to time, or any combination thereof.

16. A system in accordance with claim 13, wherein the features are the $1^{st}$ derivatives of the sensor signal levels quantized to two quantization levels.

17. A system in accordance with claim 14, wherein for each new signal sample or feature, the probability of each Hidden Markov Model is updated.

18. A system in accordance with claim 17, wherein if the probability of a Hidden Markov Model exceeds a pre-defined threshold, the recognition is stopped.

19. A computer readable medium including one or more non-transitory machine readable program instructions for receiving one or more gesture-related signals using a plurality of detection sensors; and evaluating a touchless gesture detected from the one or more gesture-related signals using an automatic recognition technique to determine if the gesture corresponds to one of a predetermined set of gestures, wherein a start of a gesture is determined if the distance between the target object and at least one sensor decreases and the distance between the target object and at least one other sensor increases, and a short term variance or an equivalent measure over a predetermined plurality of signal samples is less than a threshold.

20. A computer readable medium in accordance with claim 19, wherein a stop of the gesture is determined if at a given time, the distances between the target object and all sensors decrease and/or a short term variance or an equivalent measure over a predetermined plurality of signal samples is less than a threshold, and/or the signal changes are less than a predetermined threshold for a predetermined plurality of signal samples after the given time.

21. A computer readable medium in accordance with claim 19, wherein each gesture is represented by one or more Hidden Markov Models (HMM).

22. A computer readable medium in accordance with claim 21, wherein evaluating a gesture includes evaluating a probability measure for one or more HMMs.

23. A computer readable medium in accordance with claim 21, wherein features to which observation matrices of the one or more HMMs are associated are non-quantized or quantized sensor signal levels, x/y/z position, distances, direction, orientation, angles and/or $1^{st}$, $2^{nd}$ or higher order derivatives of these with respect to time, or any combination thereof.

24. A computer readable medium in accordance with claim 21, wherein the features are the $1^{st}$ derivatives of the sensor signal levels quantized to two quantization levels.

25. A computer readable medium in accordance with claim 22, wherein for each new signal sample or feature, the probability of each Hidden Markov Model is updated.

26. A computer readable medium in accordance with claim 25, wherein if the probability of Hidden Markov Model exceeds a pre-defined threshold, the recognition is stopped.

27. A system for gesture recognition comprising:
a sensor arrangement for detecting one or more gesture-related signals using an associated plurality of detection sensors; and
a module for evaluating a touchless gesture detected from the one or more gesture-related signals using an automatic recognition technique to determine if the gesture corresponds to one of a predetermined set of gestures, wherein each gesture is represented by one or more Hidden Markov Models, and wherein features to which observation matrices of the one or more HMMs are associated are the $1^{st}$ derivatives of sensor signal levels quantized to two quantization levels.

* * * * *